United States Patent
Posner (10) Patent No.: US 9,781,589 B1
(45) Date of Patent: Oct. 3, 2017

(54) SYSTEMS AND METHODS FOR USING ROAMING TRANSMISSIONS FOR PROVIDING ALTERNATE SMS AND MMS SERVICE ACROSS MULTIPLE NETWORKS

(71) Applicant: Tionesta, LLC, San Antonio, TX (US)

(72) Inventor: Paul Posner, San Antonio, TX (US)

(73) Assignee: Tionesta, LLC, San Antonio, TX (US)

( * ) Notice: Subject to any disclaimer, the term of this patent is extended or adjusted under 35 U.S.C. 154(b) by 187 days.

(21) Appl. No.: 14/970,853

(22) Filed: Dec. 16, 2015

Related U.S. Application Data (62) Division of application No. 14/034,247, filed on Sep. 23, 2013, now abandoned.

(60) Provisional application No. 61/704,188, filed on Sep. 21, 2012.

(51) Int. Cl.
  *H04W 4/00* (2009.01)
  *H04W 8/02* (2009.01)
  *H04W 4/14* (2009.01)
  *H04W 72/10* (2009.01)

(52) U.S. Cl.
  CPC ............... *H04W 8/02* (2013.01); *H04W 4/14* (2013.01); *H04W 72/10* (2013.01)

(58) Field of Classification Search
  CPC ....... H04W 8/183; H04W 8/12; H04W 60/00; H04W 48/18; H04W 80/04; H04L 2012/5607
  See application file for complete search history.

(56) References Cited

U.S. PATENT DOCUMENTS

| | | | |
|---|---|---|---|
| 7,277,724 B2 | 10/2007 | Jones et al. | |
| 7,379,436 B2 | 5/2008 | Jiang | |
| 7,634,281 B2 | 12/2009 | Kalavade | |
| 7,949,328 B2 | 5/2011 | Jiang | |
| 8,223,717 B2 | 7/2012 | Dillon et al. | |
| 8,331,907 B2 | 12/2012 | Jiang | |
| 8,478,277 B2 | 7/2013 | Jiang | |
| 8,825,058 B2 | 9/2014 | Feuer et al. | |
| 8,868,665 B2 | 10/2014 | Shen et al. | |
| 2003/0133421 A1 | 7/2003 | Sundar et al. | |
| 2004/0037255 A1 | 2/2004 | Joong et al. | |
| 2004/0235455 A1 | 11/2004 | Jiang | |
| 2005/0025164 A1 | 2/2005 | Kavanagh et al. | |
| 2005/0186960 A1 | 8/2005 | Jiang | |
| 2006/0079228 A1 | 4/2006 | Marsico et al. | |
| 2007/0167167 A1 | 7/2007 | Jiang | |
| 2007/0254648 A1 | 11/2007 | Zhang et al. | |
| 2007/0270145 A1 | 11/2007 | Feng et al. | |
| 2008/0176589 A1 | 7/2008 | Bantukul | |
| 2009/0196265 A1 | 8/2009 | Nieves et al. | |
| 2010/0167742 A1 | 7/2010 | Rajagopalan et al. | |

*Primary Examiner* — Steve D Agosta
(74) *Attorney, Agent, or Firm* — Daniel A. Rogers; Rosenthal Pauerstein Sandoloski Agather LLP (57) ABSTRACT

Methods and systems for providing alternate SMS/MMS traffic to a user using alternate wireless and network service. Aspects of the disclosed systems and methods allow existing wireless customers to continue using their normal wireless phone and phone number for SMS/MMS traffic while still easily avoiding large roaming and texting charges, all while nearly transparently maintaining the full range of normal wireless voice, text, and SMS/MMS services.

3 Claims, 6 Drawing Sheets

SYSTEMS AND METHODS FOR USING ROAMING TRANSMISSIONS FOR PROVIDING ALTERNATE SMS AND MMS SERVICE ACROSS MULTIPLE NETWORKS

CLAIM OF PRIORITY TO PRIOR APPLICATION AND CROSS-REFERENCE TO RELATED APPLICATIONS

This application claims the benefit of the filing date of U.S. Provisional Application Ser. No. 61/704,188, filed on Sep. 21, 2012, entitled "Systems and Methods for Using Roaming Transmissions for Providing Alternate SMS and MMS Service Across Multiple Networks" and, U.S. Nonprovisional patent application Ser. No. 14/034,247, filed on Sep. 23, 2013, entitled "Systems and Methods for Using Roaming Transmissions for Providing Alternate SMS and MMS Service Across Multiple Networks", the entire disclosure of which is hereby incorporated by reference into the present disclosure. This application is a division of application U.S. Nonprovisional patent application Ser. No. 14/034,247, filed on Sep. 23, 2013, entitled "Systems and Methods for Using Roaming Transmissions for Providing Alternate SMS and MMS Service Across Multiple Networks"

BACKGROUND OF THE INVENTION

1. Field of the Invention

The present invention is directed to improvements in the field of systems and methods for conveying text or picture data over mobile telecommunication handsets and, more particularly, for communicating SMS and/or MMS information across multiple networks through use of both IP and roaming transmissions.

2. Description of Related Art

Both Internet protocol services and cellular telecommunication services have long been available for communicating SMS text or MMS picture information when the corresponding networks are accessible. Internet protocol networks are easy enough for transmission access wherever the data connections reach—either hardwired or via WiFi. However, use of cellular radio networks generally require access to licensed RF spectrum, either via a user's home network provider or via a web of partnerships with roaming network providers, either of which usually incurs an expense for the user.

Although telecommunication services are widely available for sending cellular-based text and picture telecommunications services, such availability continues to be limited, and the limitations are compounded all the more when one end of the communication is operating outside of a home carrier's cellular network range. "Roaming" typically refers to the extension of wireless telecommunication service to a location that is outside the range of the home cellular network where the wireless device's end-user registered with a home carrier for service. Roaming is enabled by cooperative inter-carrier agreements that help ensure that any cellular device receives service despite being outside the corresponding home service provider's network. The inter-carrier roaming agreements allow companies providing service in roaming environments to charge larger fees, and access is commonly limited while roaming.

Despite the challenges and limitations, users have always wanted more access for text and picture transmission across more networks at more affordable rates. Hence, while limited solutions exist, there remains a need to transmit and access SMS and/or MMS network messages with cellular devices despite the local limitations.

Therefore and for many other reasons as may be known to those of ordinary skill in the art, there is a long-felt unresolved need in the art for better systems and methods for providing alternate SMS and/or MMS communication systems and services across multiple networks to and from wherever the cellular devices might be located at the time of transmission. Many other prior problems, limitations, obstacles and deficiencies (collectively, "challenges") will be generally known to those of skill in the art and will otherwise be evident from the following descriptions as well as from thoughtful consideration of any claims that may be added or appended hereto or to an application claiming priority hereto.

SUMMARY OF THE INVENTION

The present invention is directed to overcoming the challenges of the prior art through methods and systems of providing alternate SMS and/or MMS service in ways that innovatively overcome the typical challenges of remote access. Some aspects of the invention allow wireless telecommunication customers to manage expenses while maintaining more of their full range of SMS and/or MMS services (for reference, collectively, "personal electronic communication services") despite their location. Comparable benefits are realized with aspects of the invention that can also enable other types of data services such as Internet access service.

Embodiments of more particular aspects of the invention further have the benefit of being mostly transparent to the wireless user. In the principal preferred embodiment, a wireless user entering the roaming environment enables functionality by the simple steps of registering their device through initiation with an unlicensed spectrum provider and/or installing an app (or the equivalent) on their cellular phone. The installed app is preferably adapted to partially automate the registration step and to temporarily disable the device's normal wireless radio (normally referred to as putting the phone into "airplane mode") while concurrently activating WiFi radio capabilities on the device. Hence, the principal embodiment allows a user to continue using their own cellphone (or other portable communication devices) with the same phone numbers and substantially the same functionality even when they are outside their home network. Alternative embodiments potentially in the scope of the invention may be implemented in other modes as well, such as through alternate provision of pre-programmed dedicated handsets.

Many embodiments of the current invention take advantage of installed, high capacity WiFi network providing ubiquitous wireless coverage throughout areas which users frequent. Other aspects of many embodiments also capitalize on the fact that many cellphones, including most if not all current smartphones, are provided with WiFi communication capabilities.

Some embodiments of the invention may include a combination of the primary aspects of the invention together with an app that, when downloaded and operating on an end user device, enables connection of that device to a server capable of providing the alternate service. The app mimics all personal SMS and/or MMS communication services the end user is used to having when connected to his home wireless service network, including similar user interface(s)

on the device, making user interaction the same as he is used to. The app communicates directly with a server accessed via standard internet or other suitable protocols.

The roaming user is able to use his regular phone and phone number for all personal electronic communication services. Preferred embodiments of the invention accomplish this result through an integrated software app that connects through WiFi, one or multiple servers, and the Internet to a specialized network infrastructure set up on the backend at a switching center.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described. For purposes of these descriptions, it should be understood that (absent clear context otherwise) the terms "cellular phone" or "wireless device" or "wireless handset", or the like are generally considered interchangeable concepts that include, but are not limited to, mobile devices, smartphones, wireless phones, and wireless devices.

DETAILED DESCRIPTION OF PREFERRED EMBODIMENT

As previously stated, the present invention is directed to providing methods and systems for providing alternate SMS and/or MMS communication service while outside of a home cellular network. In these descriptions, the term "cli-ent" includes (but is not be limited to) users, customers, and consumers. "Client" should also be understood to refer to any person or organization with an interest in conveying text or pictures wirelessly to another person or organization. The term "wireless phone" or the like should generally be understood to include (without limitation) mobile devices, cellphones, smartphones, wireless phones, and other wireless devices, to the extent that such devices would fall within the scope of any patent claims that may ultimately issue based on these descriptions.

Figure 1:
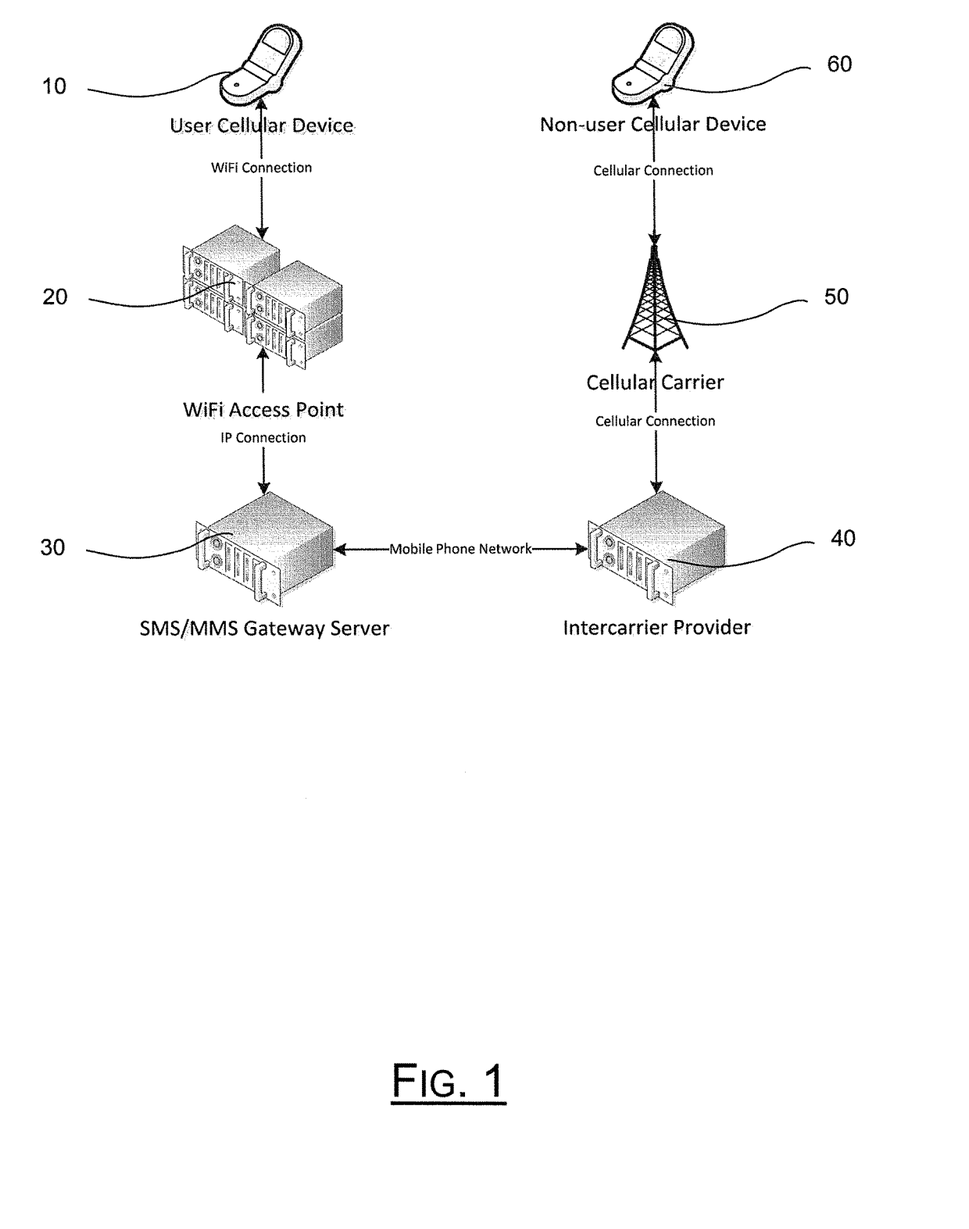
FIG. 1 is a high-level view of major components of a typical preferred embodiment of the present invention.

Turning to FIG. 1, which shows a high level view of a typical preferred embodiment of the present invention with all of its major components. The User Wireless Device 10 is any WiFi capable mobile communication device used by the user of the preferred embodiment, although a preferred example of the User Wireless Device 10 is a smartphone.

Figure 2:
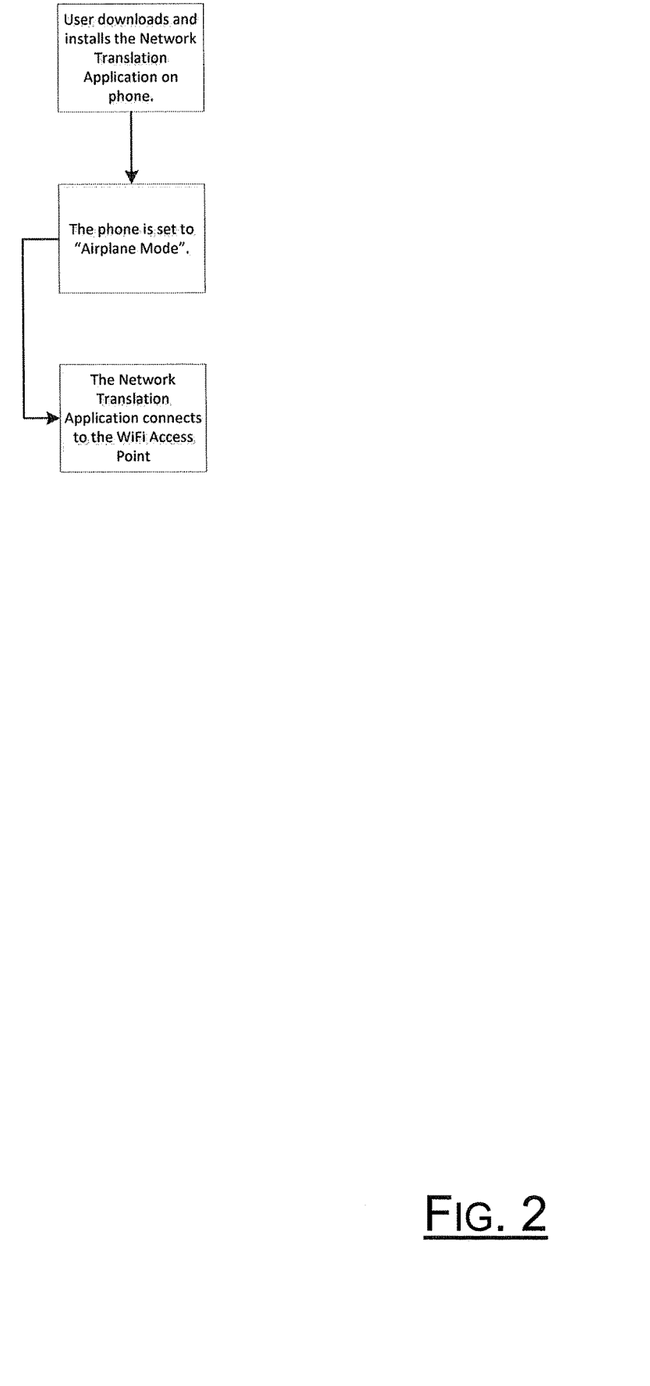
FIG. 2 is a flow diagram of basic steps for user initiation of functionality in conjunction with principal preferred embodiments of the present invention, preferably undertaken when a user first enters or commences enabled communications within the captive environment of a cruise ship.

With reference to FIG. 2, in order to enable use of the preferred embodiment, a user installs the Network Translation Application 15 on the User Wireless Device 10. In the preferred embodiment, User Wireless Device 10 is then set to "Airplane Mode" by the user (or, even more preferably, automatically by the Network Translation Application 15). Placing the Device 10 in airplane mode effectively turns off the cellular radio in the Device 10, and the Network Translation Application 15 then activates WiFi functionality in the Device 10. In another embodiment, the Network Translation Application 15 has intelligence built into it allowing the user, cellular service provider, WiFi network operator, or another party to automatically prioritize and/or select which form of wireless access (cellular, WiFi, other) the Device 10 will choose to operate on and turn other wireless access radios on and off in various combinations. In the course of initiation for the Device 10, the Network Translation Application 15 preferably automatically guides the end user through a simplified process of registering the device for use with the on-board server.

The Network Translation Application 15 sends and receives the personal electronic communication sent to or by the User Wireless Device 10. To a user, the User Wireless Device 10 keeps all the functionality normally available over the wireless home service network. For purposes of this document the wireless home service network can be any wireless communications network that is the primary wireless network of the User Wireless Device 10. The Network Translation Application 15 communicates with the WiFi Access Point 20 through WiFi or other wireless communications network instead of or as a complement to a cellular network. In some embodiments the Network Translation Application 15 manages a first wireless communications network as well as a second wireless communications network simultaneously. For example, if the signal level of the first wireless communications level is low, the Network Translation Application 15 will transfer any SMS/MMS messages via the second wireless communications network.

The WiFi Access Point 20 communicates with the SMS/MMS Gateway Server 30 via an internet connection. SMS/MMS Gateway Server 30 acts as a bridge between the invention and an Inter-carrier Provider 40 through the normal mobile phone network interconnection circuits and protocols. The Inter-carrier Provider 40 interfaces with a Cellular Carrier 50, which said Cellular Carrier 50 then interacts with the Non-user Wireless Device 60. This is described in further detail below.

Figure 3:
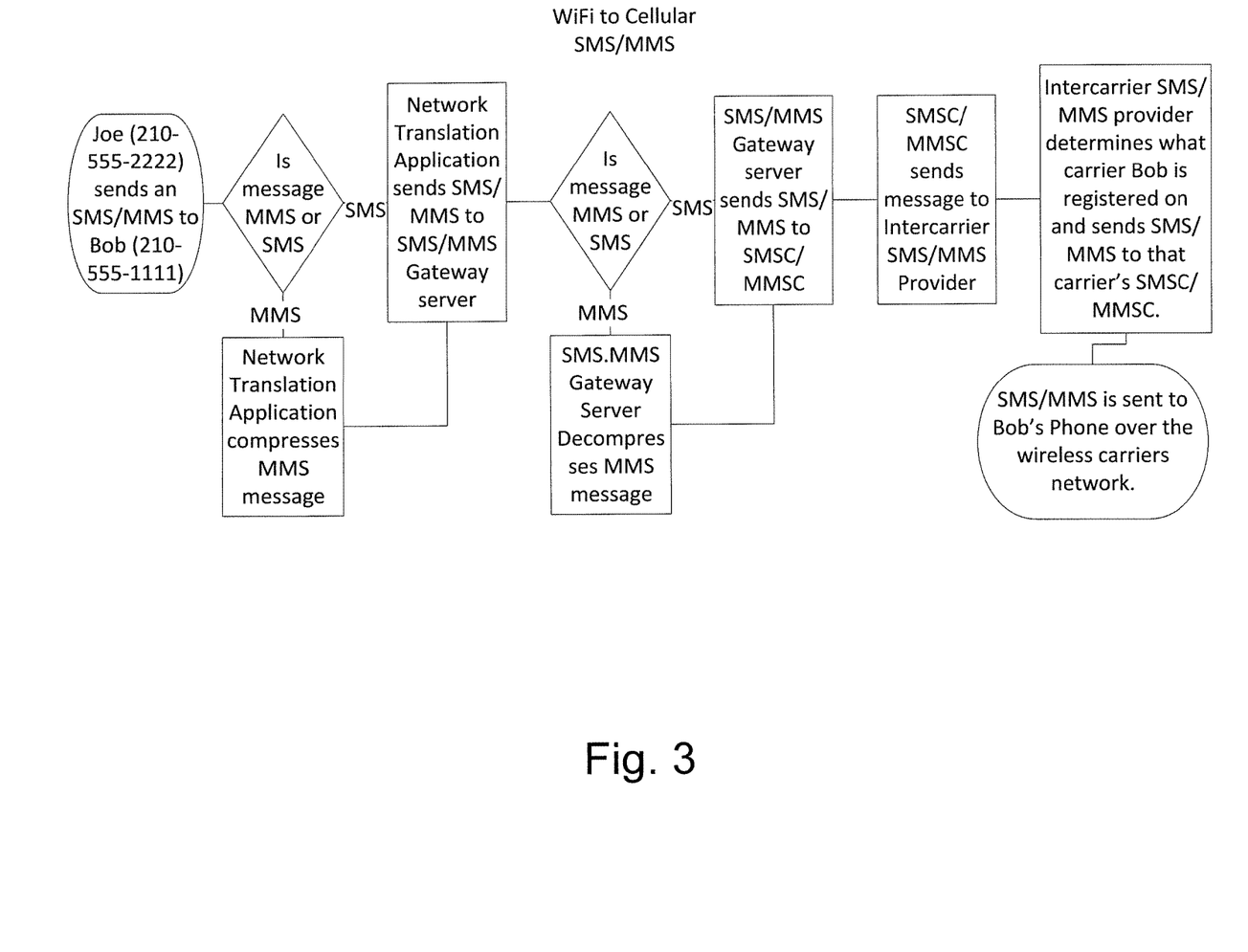
FIG. 3 is a flow diagram of a typical preferred embodiment of the present invention for the Cellular to WiFi/SMS/MMS/component of a principal preferred embodiment of the invention.

FIG. 3 describes the method and systems of the present invention using the example of a roaming user sending a personal electronic communication message to another wireless device. Prior to step 1, the user has already installed and correctly configured the Network Translation Application 15 on the user's User Wireless Device 10. The process begins with the user instigating a personal SMS and/or MMS communication message (hereinafter alternately referred to as the "communication") as the user would normally do. The Network Translation Application 15 sends the communication to the WiFi Access Point 20 using a WiFi or other wireless connection and using the Internet Protocol (IP) or another protocol.

The WiFi Access Point 20 forwards the communication to the SMS/MMS Gateway Server 30. In one embodiment the Network Translation Application 15 determines the nature of the communication and processes further transmission of the communication based on that determined nature. If the communication is an MMS message (for example, a picture message), the Network Translation Application 15 looks at the file size or other parameter(s) and determines whether the MMS message should be compressed prior to sending a corresponding communication to the Recipient via SMS/MMS Gateway Server 30.

The SMS/MMS Gateway Server 30 acts as a link between the IP traffic of the invention and the standard mobile phone network. When the user first downloads the Network Translation Application 15, the SMS/MMS Gateway Server 30 updates the home carrier's Visitor Location Register (VLR) of the Cellular Carrier 50. This sets User Wireless Device 10 as roaming on the Cellular Carrier 50. The Cellular Carrier 50 then routes all communications to the User Cellular Device 10 through the SMS/MMS Gateway Server 30. The SMS/MMS Gateway Server 30 un-compresses the communication if needed and forwards the communication through the normal mobile phone network to the Cellular Carrier 50 as is known in the art. Furthermore, as set forth in FIGS. 5 and 6, the SMS/MMS Gateway Server 30 can detect text or voice traffic and routes voice calls via a SIP server. Thus, the user of the invention is able to receive all voice and text communications via the method of the present invention.

In one alternative the SMS/MMS Gateway Server 30 converts the communications to a communication format compatible with the normal mobile phone network. In other alternatives, the SMS/MMS Gateway Server 30 immediately updates the VLR in real time rather than using batch updates as is known in the art.

The SMS/MMS Gateway Server 30 passes the communication on through an Inter-carrier Provider 40 through to a Cellular Carrier 50 and ultimately to a Recipient Wireless Device 60 as is standard and known in the art for personal electronic communications.

Figure 4:
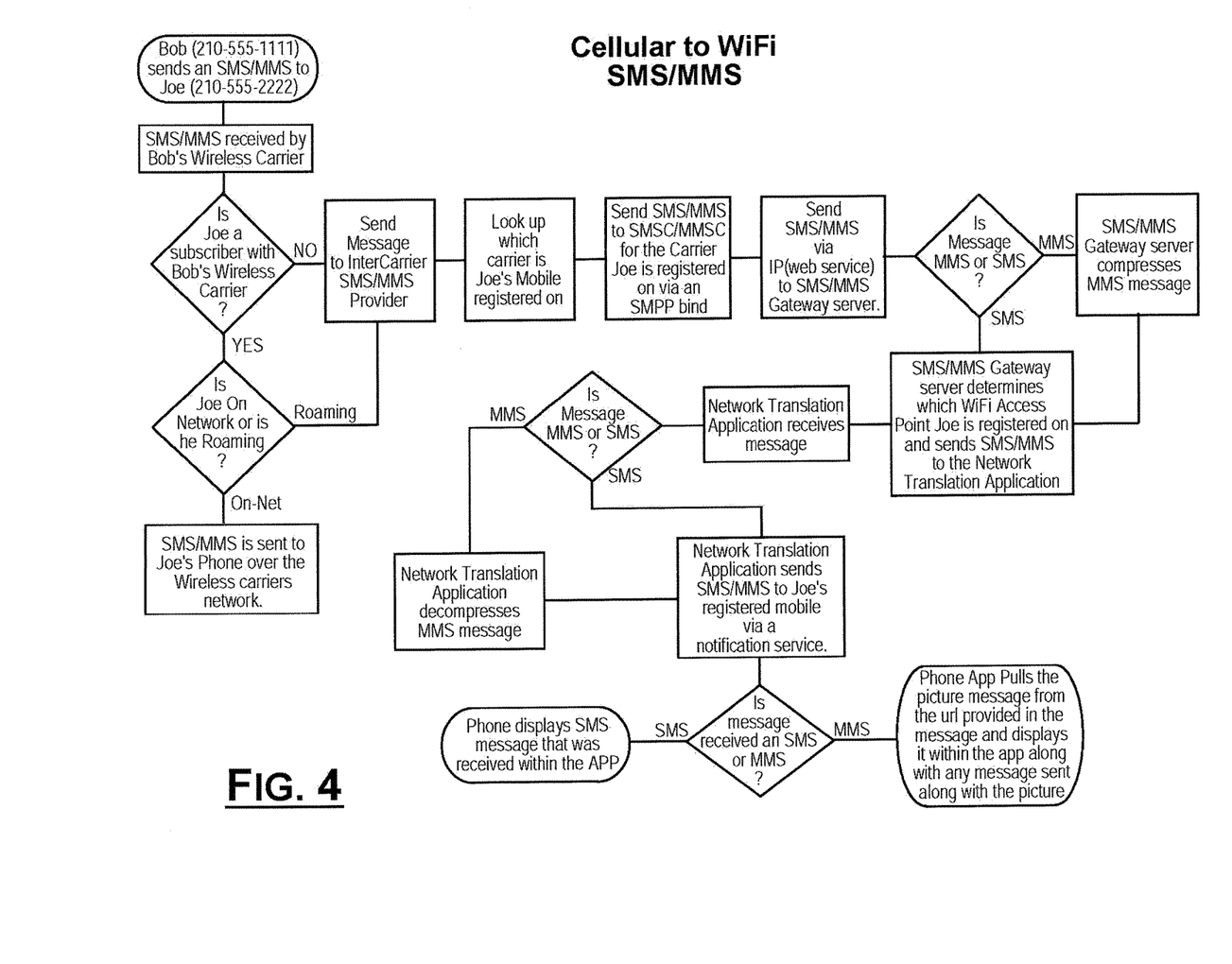
FIG. 4 is a flow diagram of a typical preferred embodiment of the present invention for the WiFi to Cellular/SMS/MMS component of a principal preferred embodiment of the invention.

FIG. 4 describes how communications from the normal mobile phone network are transmitted through to the User Wireless Device 10 using the present invention. A User Wireless Device 10 registered on the SMS/MMS Gateway Server 30 appears as roaming to the home Cellular Carrier 50. Communications sent to such a User Wireless Device 10 travels through the normal mobile phone network as is known in the art. When the communication reaches the SMS/MMS Gateway Server 30, it is analyzed according to its type. If the communication requires compression (such as a MMS message), the SMS/MMS Gateway Server 30 compresses the communication. The SMS/MMS Gateway Server 30 then determines which WiFi Access Point 20 the User Wireless Device 10 is registered on.

The SMS/MMS Gateway Server 30 sends the communication to the WiFi Access Point 20. The SMS/MMS Gateway Server 30, in some embodiments, can provide QoS analysis, queuing, and prioritization of the communication to prevent bandwidth overload. The WiFi Access Point 20 sends the communication to the User Wireless Device 10. The Network Translation Application 15 un-compresses the communication if required. The communication is then accessible to the user via the Network Translation Application 15. In another embodiment, the SMS/MMS Gateway Server 30 sends a message to the User Wireless Device 10 indicating that a large message was sent and is being held for later retrieval. It may provide some information about the message being held, for example the name of the sender, the name of the file, and/or a truncated, compressed version of all or part of the message.

Figure 5:
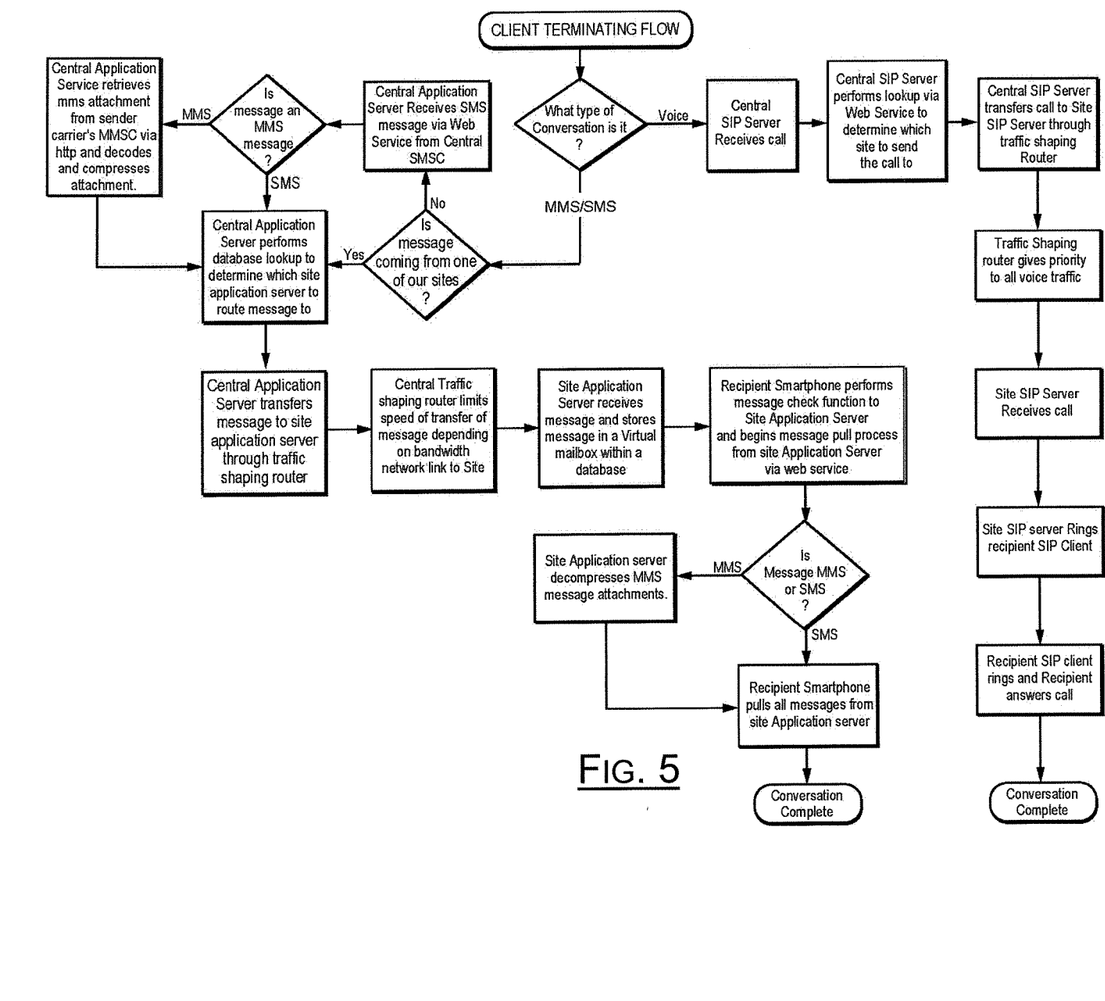
FIG. 5 is a flow diagram providing an alternate perspective and variations of a typical embodiment of the present invention for terminating and handling wireless data or voice.
Figure 6:
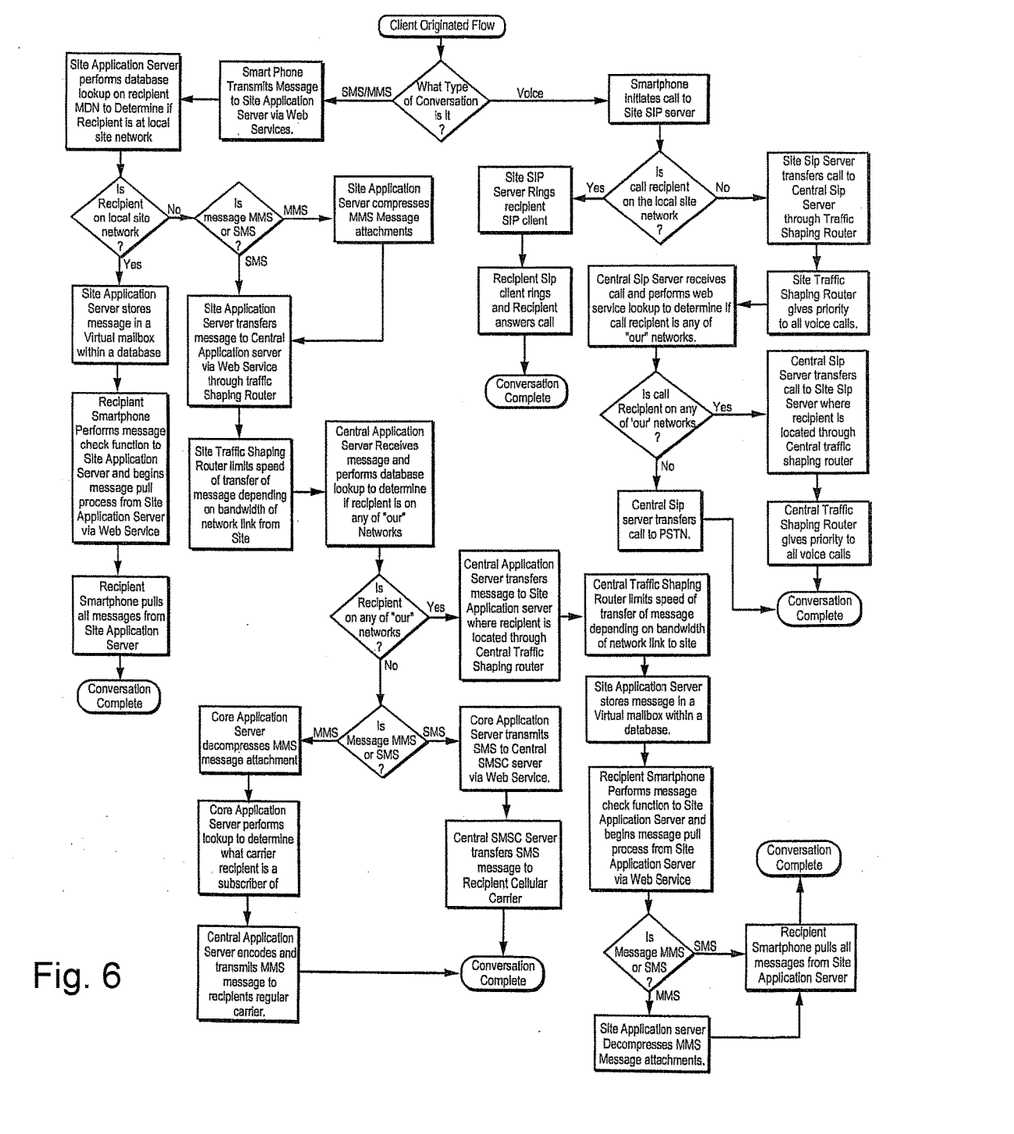
FIG. 6 is a flow diagram providing an alternate perspective and variations of a typical embodiment of the present invention for initiating and handling wireless data or voice communications.

FIG. 5 is a flow diagram providing an alternate perspective and variations of a typical embodiment of the present invention for initiating wireless data or voice communications on the WiFi Access Point 20 (also referred to as the Site Application Server) and the SMS/MMS Gateway Server 30 (also referred to as the Central Application Server). FIG. 6 is a flow diagram providing an alternate perspective and variations of a typical embodiment of the present invention for terminating wireless data or voice communications on the WiFi Access Point 20 (also referred to as the Site Application Server) and the SMS/MMS Gateway Server 30 (also referred to as the Central Application Server).

The present invention therefore allows users to use their normal phone and phone number to receive personal electronic communication messages while roaming and, in addition, avoid exorbitant roaming and/or access charges.

Indeed, while principally preferred embodiments have been described with reference to adaptations for use in the particular roaming environment to the extent captured within the enforceable scope of any claims corresponding to these descriptions, alternative embodiments are comparably adapted for use in other environments. In addition, again only to the extent still falling within the enforceable scope of any corresponding claims (including under the doctrine of equivalents), still other alternative embodiments are adapted and configured for comparable use on military bases, on university or corporate campuses, or in commonly associated business and/or housing facilities.

While the preferred embodiments have been described with certain features, many alternative embodiments will have more features than described herein, and many other alternatives will have fewer features and/or alternative features as will be understood to those of skill in the art. For instance, although certain preferred embodiments are focused on providing personal electronic communications, other embodiments may only provide one such form of communication, and still other embodiments may also provide other features such as data connectivity (i.e., Internet web service) and/or any number of other known handset features and/or services that can be enabled on or in conjunction with wireless handsets.

With reference again to FIG. 1, a preferred embodiment is provided in the form of software that is installed and adapted to interact with the handset, servers and client support agents. It should be understood that the graphical representation of the system is an exemplary reference to any number of software systems that may be implemented by the present invention.

In some embodiments of the present invention, the method and systems described are provided via computer software, either via the internet, via a stand-alone software application operating independently or in connection with other software systems, or some combination of the two. As well, embodiments may come in any known form and may also be implemented by hardware, software, scripting languages, firmware, middleware, microcode, hardware description languages, and/or any combination thereof.

When implemented with coded programming, it should also be understood that the program code or code segments to perform the necessary steps or tasks of alternative embodiments may be coded in solid state or may be stored in a machine-readable medium such as a computer storage medium. A code segment or machine-executable step or instruction may represent a procedure, a function, a subprogram, a program, a routine, a subroutine, a module, a software package, a script, a class, or any combination of instructions, data structures, and/or program statements. Executable code segments may also be coupled to other code segments or to a hardware circuit by passing and/or receiving information, data, arguments, parameters, and/or memory contents, which may be passed, forwarded, or transmitted via any suitable means including memory sharing, message passing, token passing, network transmission, etc.

Specific details are given in the above description to provide a thorough understanding of various preferred embodiments. However, it is understood that these and other embodiments may be practiced without these specific details. For example, processes may be shown in block diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve use middleware and/or other software implementation; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an internet connection service. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Although less preferred, some alternative embodiments of the invention may not be fully enabled to complete outbound calls on licensed cellular networks. Such alternative embodiments are referred to as "License-Disabled" to differentiate from other embodiments, because they fulfill most if not all of the other functional and other characteristics as are described above, except that they are functionally unable to consummate an outbound call on a licensed cellular network. Hence, any outbound cellular call that may be initiated by an end user with such a License-Disabled embodiment would be dropped prior to (or rather than) being connected with a licensed cellular network. It is contemplated nonetheless that such a License-Disabled embodiment could be modified after being put in use in order to add the omitted functionality, either through securing and enabling rights to transmit on licensed cellular networks, or through removing or changing the state of a component that causes the embodiment to not have full functionality.

While the principles of the disclosure have been described above in connection with specific apparatuses and methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

What is claimed is:

1. A communication routing system for intelligent routing of personal text messages and voice communications of a user using said user's home phone number, comprising:
   a. a communications gateway server;
   b. a wireless telecommunications device including a plurality of communication lines, with at least one of said plurality of communication lines being connectable for remote communication through the internet with said communications gateway server;
   c. a network routing application installed on said wireless telecommunications device;
      i. said network routing application being programmed to be activated or deactivated by the user of said wireless telecommunications device;
      ii. when active said network routing application being further programmed to register with said communications gateway server using said at least one of said plurality of communication lines being connectable for remote communication through the internet;
      iii. when active said network routing application being further programmed to manage said plurality of communications lines to automatically prioritize and select which of said plurality of communication lines to utilize for text and voice communications based on cost, signal strength, reliability, and battery;
      iv. when active said network routing application being further programmed to automatically measure connectivity and reliability, automatically manage and switch networks, and automatically turn on and off the wireless access radios of said wireless telecommunications device;
      v. when active said network routing application being further programmed to send and receive all text communications to and from said wireless telecommunications device via said communications gateway server;
      vi. when active said network routing application being further programmed to send and receive all voice communications to and from said wireless telecommunications device via a SIP server as directed by the communications gateway server;
      vii. when active said network routing application being further programmed to use the standard voice dialer and texting applications on said wireless telecommunications device;
      viii. when deactivated said network routing application restoring the standard function of said wireless telecommunications device;
   d. said communications gateway server being hardware integrated and interfaced with the cellular network as an inter-carrier provider;
      i. said communications gateway server being programmed to update said user's home carrier's visitor location register setting said wireless telecommunications device as roaming when said network routing application registers on said communications gateway server;
      ii. said communications gateway server being further programmed to route all text communication via said communications gateway server to said network routing application;
      iii. said communications gateway server being further programmed to route all voice communication via said SIP server.

2. The system of claim 1 wherein said at least one of said plurality of communication lines being connectable for remote communication through the internet is via cellular data.

3. The system of claim 1 wherein said at least one of said plurality of communication lines being connectable for remote communication through the internet is via WiFi data.

* * * * *